Feb. 28, 1950 E. O. WILLOUGHBY 2,498,732

RADIO NAVIGATION SYSTEM

Filed Aug. 11, 1945 2 Sheets-Sheet 1

Inventor
Eric Osborne Willoughby
By E. D. Phinney
Attorney

Inventor
Eric Osborne Willoughby
By E. D. Phinney
Attorney

Patented Feb. 28, 1950 2,498,732

UNITED STATES PATENT OFFICE 2,498,732

RADIO NAVIGATION SYSTEM

Eric Osborne Willoughby, Aldwych, London, England, assignor, by mesne assignments, to International Standard Electric Corporation, New York, N. Y., a corporation of Delaware Application August 11, 1945, Serial No. 610,364
In Great Britain August 11, 1944

9 Claims. (Cl. 343—107)

The present invention relates to radio navigational systems and has for one of its objects to provide such systems in which phase or frequency modulation technique may be employed at the receiver, so as to take advantage of the fact that interference by other radiations, for example at the same frequency, at adjoining air fields is minimised or eliminated because the frequency or phase modulation having a frequency or phase discriminating circuit discriminates completely between two frequency modulation signals of similar excursion or magnitude of modulation provided that the two signals have more than 6 decibels difference in energy levels at the receiver.

It will be observed that phase or frequency modulation as such cannot be radiated for the purpose of fulfilling this object, because the magnitude of the modulation would be the same in all directions and at all points within the distribution pattern. It is therefore necessary to create the phase modulation at the receiver location, a characteristic of the modulation giving the desired information at a point in space.

Broadly, according to the present invention, a navigational system for defining a path or course by two overlapping radiation diagrams commutated to produce complementary signals to the right and left of the course respectively comprises means for radiating from substantially the same centre two different radiation patterns, one being the side bands of an amplitude modulation of a carrier wave, the other, the unmodulated carrier wave, with means for oscillating or commutating at least one of said patterns about the desired course line in complementary signal fashion.

The unmodulated carrier and the carrier component of the side bands may be in phase in which case pure amplitude modulated waves are created in space and a normal type or amplitude modulation detector may be employed to receive these waves.

In order to create a phase modulation in space as required to fulfill the object specified hereinbefore, the carrier component of the sideband energy and the unmodulated carrier wave energy are transmitted in phase quadrature. There will thus be received by a receiver at any point within both radiation patterns the side bands and the unmodulated carrier which produce when combined a phase or frequency modulated carrier frequency wave, whose modulation magnitude depends upon the relative amplitudes of the side bands at the receiver location.

If the radiation patterns of two antenna systems radiating respectively carrier wave and side bands only due to amplitude modulation are radiated substantially from the same centre so that the path differences in any operating direction in space between a receiver location and the antenna systems are small compared to a quarter wave length of the operating frequency, there will be a phase modulation having a phase excursion equal to the angle $\theta$ given by $$\tan \theta = \frac{I_{sb}}{I_c}$$

in which $I_{sb}$=side band amplitude
$I_c$=carrier amplitude at any location of the receiver. It is preferable that the polarisations of the side bands and carrier are substantially the same.

In carrying the invention into practice, the two radiation patterns are different so that in any direction the amplitudes or energy levels of the sidebands and the unmodulated carrier wave are different. One of the patterns is switched or oscillated about a desired path in a dot-dash rhythm. The radiations are received together on a frequency or phase modulation receiver. Such receivers usually contain amplitude limiters and a frequency discriminating circuit so that the amplitude of the input to the discriminator circuit is constant and the amplitude of the discriminator output is proportional to the phase changes occurring in the input.

The great advantage of utilising frequency modulation reception technique is that interference by other radiations, for example at the same frequency, at adjoining airfields, is minimised or eliminated owing to the fact that the discriminator type of receiver discriminates completely between two frequency modulated signals of similar excursion or magnitude of modulation provided that the two signals have more than 6 decibels difference in level.

The invention will be made clearer in the following description of several embodiments illustrated in the accompanying drawings in which.

Figure 1:
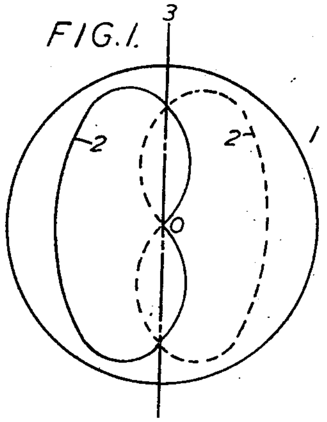
Figures 1 and 3 show diagrammatically the radiation distribution diagrams of beacons embodying the present invention.

Figure 1 shows diagrammatically the radiation distribution diagrams of a radio blind approach beacon embodying the invention. 1 is the diagram or distribution pattern of the unmodulated carrier wave which is radiated omnidirectionally giving a circular radiation pattern while the sideband radiation pattern 2 is of cardioid shape and is reversed in well known manner about the desired approach path 3 in a dot-dash rhythm. When a frequency modulation receiver is in the desired path 3 it will give output signals of equal strengths for the dot and dash periods.

Figure 2:
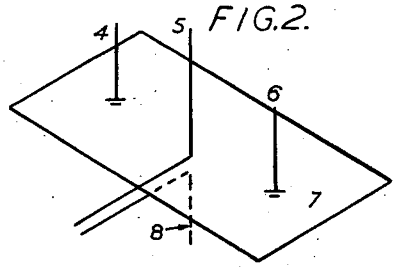
Figures 2 and 4 show diagrammatically practical forms of antenna systems used in carrying out the present invention for a blind approach path in a horizontal plane.

Means for oscillating a radiation pattern about a desired path are now well known and need not be fully described herein. One convenient form of beacon, for carrying out this embodiment in practice is illustrated in Figure 2. The switching antenna system comprises three linear antenna 4, 5, 6, in alignment and located above a conducting plane or metal sheet 7. The centre antenna 5 is fed with the side band energy while the two outer antennas 4 and 6 operate alternately as reflectors, or as reflector and director in well known manner to produce the oscillation of a cardioid type pattern 2 in Figure 1. A single linear antenna 8 is located below the said conducting plane 7 and is energised continuously with unmodulated carrier waves, giving the circular radiation pattern 1 in Figure 1. This antenna arrangement ensures that both the omnidirectional or unmodulated carrier antenna and the sideband antenna have the same radiation centre.

Figures 3, 4, 6:
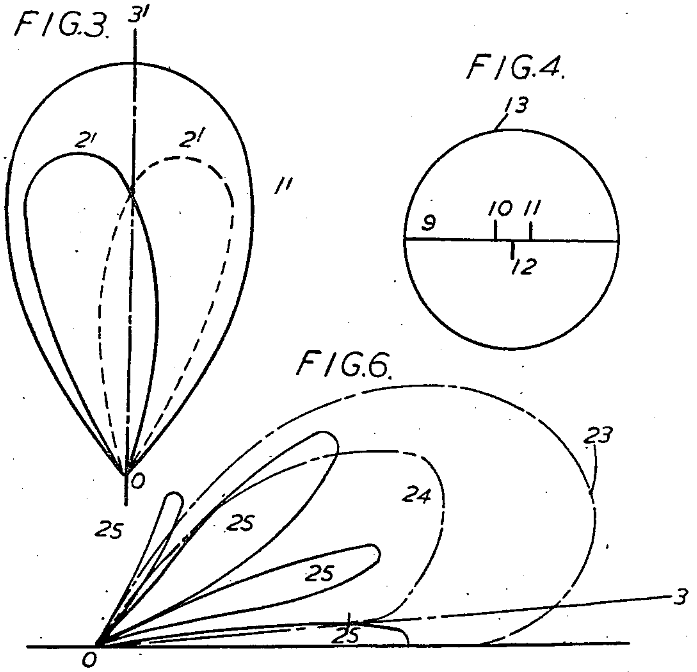
Figure 6 shows the distribution patterns obtained in a vertical plane by the antenna system of Figure 5.

In another embodiment of the invention both the side band radiation and the unmodulated carrier wave radiation have directive radio patterns as illustrated in Figure 3, one of which, namely 1′, is stationary and the other, namely 2′, is oscillated about the desired approach or azimuth path 3′, as indicated by the full line and broken line patterns 2′. A frequency modulation receiver is used giving in the output equal or constant ratio amplitude modulated signals for the dot-dash periods when the receiver is on the said approach or azimuth path 3′.

A suitable form of beacon antenna system for producing patterns as shown in Figure 3 is illustrated in Figure 4, and comprises a conducting plane 9 having two linear antennae 10, 11 above the plane 9 energised alternately with the side band energy and a linear antenna 12 below the plane and centrally located with respect to the antennae 10, 11 and energised continuously with unmodulated carrier frequency energy. A reflector 13 is employed to give directivity to the radiations from the antennae 10, 11, 12. A suitable device for feeding the two side band antennae in dot-dash rhythm will be found described in U. S. Patent No. 2,444,081, issued June 29, 1948 and U. S. Patent No. 2,413,018, issued December 24, 1946.

Figure 5:
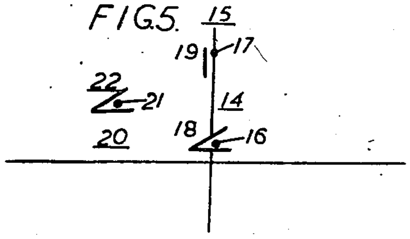
Figure 5 shows diagrammatically a practical form of antenna system used in carrying out the present invention in a glide path system for aircraft.

An embodiment of a glide path system, such as illustrated in Figure 5 may be employed. It comprises two antennae 14, 15 off set from the azimuth path. Each antenna comprises a dipole illustrated by 16, 17 respectively and a reflector illustrated by 18, 19 respectively to give directional characteristics. One antenna, namely 15, is raised above the ground to a greater height than the other 14 and has a plane reflector 19 while the other has a parabolic reflector 18. These two antennae 14, 15 are fed alternately in dot-dash rhythm, for example by the switching device referred to hereinbefore. In addition to these two antennae 14, 15 a further antenna 20 comprising dipole 21 with parabolic reflector 22 is located behind the two systems 14, 15 and fed continuously with the unmodulated carrier frequency.

The carrier wave radiation pattern from 20 is arranged as indicated in Figure 6, in which the carrier pattern is indicated at 23 to envelope the dot-dash side band lobes indicated at 24 and 25 and on account of the vertical separation of the two side band antennae 14, 15 necessary to obtain the desired patterns, it is necessary usually to locate the carrier antenna 20 behind the line of the two side band antennae.

For adjustment purposes the two side band antenna 14, 15 are arranged to be in phase along the course line by feeding them with unmodulated carrier wave and adjusting for minimum keying clicks. The double side band energy is then fed to these two antennae through the switching device and the carrier antenna 20 adjusted along the course line to give a maximum indication on the course line of the dot or dash signal with a receiver utilising a frequency or phase discriminator circuit.

Figures 7, 8, 9:
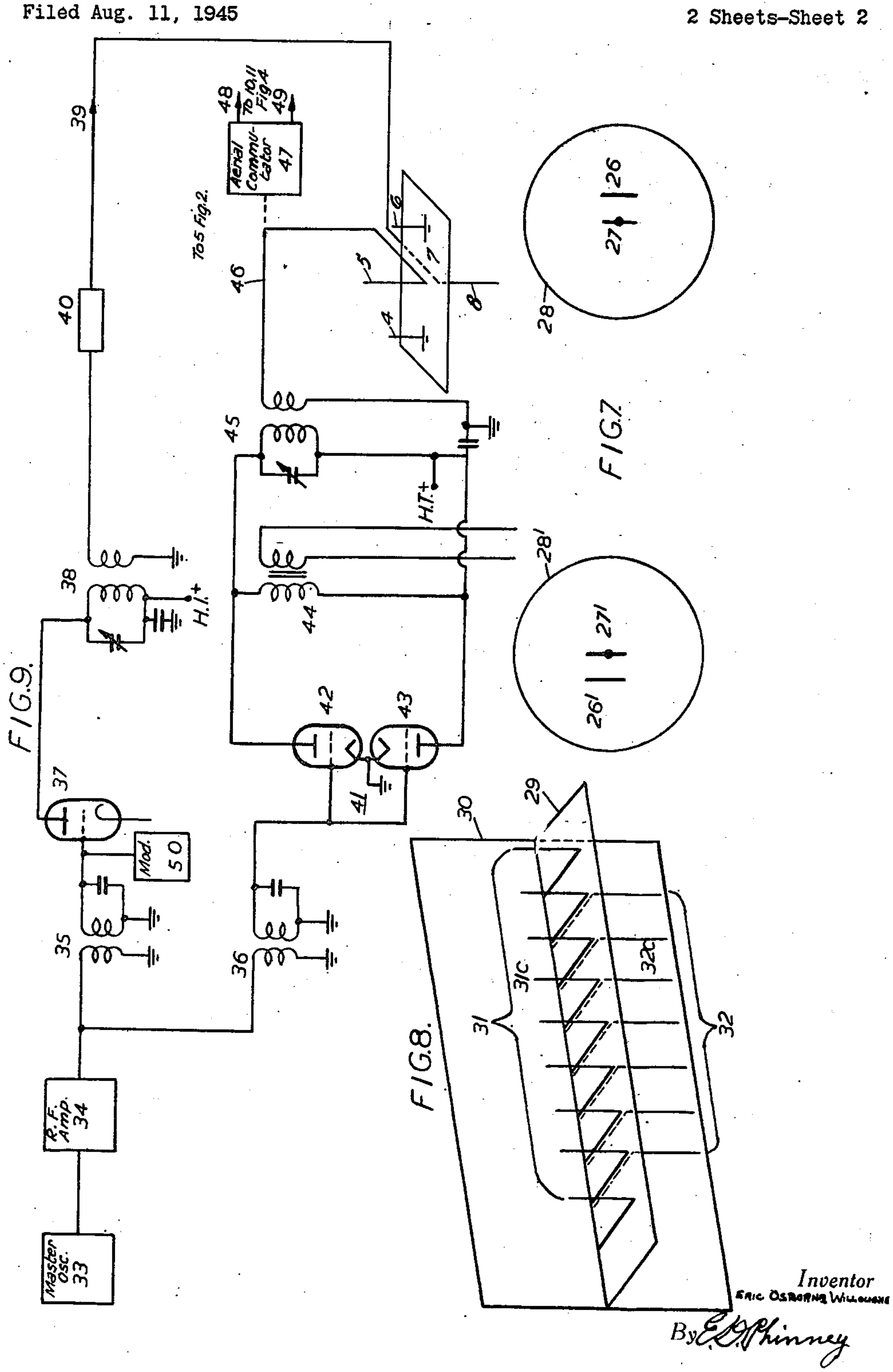
Figures 7 and 8 illustrate diagrammatically other forms of antenna systems for a blind approach path.
Figure 9 shows the circuit diagram of one suitable form of transmitter for exciting the antenna system in accordance with the present invention.

It will be observed that variations in the systems described may be made without departing from the invention. For example, both the side band energy and the carrier energy may be switched simultaneously so long as there is a variation of depth of resulting phase modulation in space, each sideband pattern being allotted a corresponding carrier lobe. This may have advantages when antenna systems having high directivity are to be set up as it enables separate reflectors to be used while avoiding the difficulties with regard to maintaining the 90 degree phase difference on course between double side bands and carrier when utilising wide aperture radiation systems. For example as shown in Figure 7 a side band antenna 26, 26′ and a carrier antenna 27, 27′ may each utilise the same reflector 28, 28′ respectively with the side band antenna 26, 26′ offset from the focus occupied by the carrier antenna 27, 27′ to obtain overlapping lobes, the sidebands being of lower energy level than the carrier, so that a changing depth of modulation occurs along the course line.

For clearness and freedom from ambiguity, the carrier level should change very slowly on crossing the course line, and be equal for the radiations from the two sets of antennae 26, 27, 26′, 27′, or alternatively the two carrier lobes from 27′, 27′ should intersect on the same line as the side band lobes from 26, 26′.

It is possible to concentrate a narrow beam of side band energy or carrier energy along the course line and switch the carrier or side band energy respectively if highly distorted phase modulation at points well off the course is of no moment, but in general the preferred systems described hereinbefore have least ambiguity of indication and fewer variables to adjust in setting up the system.

More elaborate embodiments of the invention involve radiation of the carrier and even harmonic frequency side bands of the modulation frequency from one antenna system for example 26, 27, and the odd harmonic side bands from the other antenna system 26', 27', but the extra complication is hardly justifiable, because while relatively pure wide phase excursion modulation may be obtained along the course line, large distortion from pure phase modulation will result in directions transverse thereto.

Moreover, radio frequency signal-to-noise ratio considerations are usually of little moment in landing operations and a small phase excursion is therefore of little moment and can readily be offset by using a receiver with a frequency changer followed by a number of stages of frequency multiplication prior to application to the limiter and discriminator section of the frequency or phase modulation receiver. Alternatively, a relatively large frequency excursion can be ensured by the use of a high modulating frequency with phase excursion of the order of 930 degrees.

Although it is simpler to radiate unmodulated carrier and side band energies from the one radiation centre, if antennae of high directivity are desired to define a sharp beam confined to a small angle of space, it is then possible to cope with wider spacings of antennae within the group and still maintain substantially 90 degrees phase difference over the portion of the space containing important operational angles. If there is any appreciable relative spacing between the unmodulated and side band radiating antenna systems, either in horizontal or vertical plane, a series of zones in space of zero phase modulation will result when the phase of the resultant side band will change from being 90 degrees out of phase with the carrier to being in phase with the carrier and these zero phase modulation directions then become directions of pure amplitude modulation.

Two sets of interlaced arrays, or arrays mounted symmetrically about a conducting plane as illustrated in Figure 8 may be used to provide the carrier and side band radiations.

In Figure 8, two conducting planes 29, 30 intersect at right angles. Above the horizontal plane 29 is arranged an array of antennae 31 for transmitting the side band energy and below the plane 29 is arranged another array of antennae 32 for transmitting the unmodulated carrier energy. The array 32 is normally less directive than the array 31 and is fed with greater power than the array 31. To this end, the array 31 may comprise a larger number of antennae than the array 32.

The swing of the side band radiation lobes from array 31 off centre is produced by adjusting the phase difference between adjacent antennae according to known manner with alternate antennae undergoing a phase switching, the centre antenna 31C of the side band system being maintained at 90 degrees phase difference from the centre antenna 32C of the unmodulated carrier system 32, or arranged so that it is displaced along the desired path a distance which will result in 90 degree phase difference between the space fields produced by arrays 31 and 32.

The carrier radiation may be employed as an intelligence bearing channel, for example, speech and the modulation of the carrier wave by the intelligence bearing signal wave may be amplitude modulation or phase or frequency modulation.

Consider first a system where speech is radiated by a frequency modulated carrier.

Since the keyed side bands must add to the fundamental carrier wave to produce a phase modulation keyed in space it is essential that the carrier should always be present without being too violently altered in magnitude, and for this reason the maximum phase excursion of the applied speech should not exceed 30 to 40° in an ideal system, although it is considered a large excursion frequency modulation will give a true course line if dot-dash keying is used in conjunction with a well damped course indication meter.

For the same reason if amplitude modulation by the speech is applied to the carrier, this should be a low percentage modulation, for example, of the order of less than 30%.

In either case by using a modulation frequency of the order of 10 kc. for the keying sidebands the path definition frequency may be filtered off from the speech and both dealt with independently.

Since noise is not of importance in radio navigational systems the effective phase or frequency excursion of 30° of the carrier is no handicap and can be readily stepped up by using a frequency change in the receiver to step the carrier fully down without the need of frequency multiplication.

Figure 9 shows one practical circuit arrangement for producing the side band frequencies and the carrier frequency. In this figure the block 33 represents a master oscillator unit and the block 34 a radio frequency amplifier which may or may not be necessary for systems radiating low power. 35 and 36 are radio frequency coupling units, unit 35 driving the input stage of a radio frequency amplifier 37 whose output feeds through the tuned transformer coupling 38 into the transmission line 39. A transmission line length adjusting unit represented by block 40 is included between 38 and 39. The line 39 feeds antenna 8, Figure 2, or 12, Figure 4.

The radio frequency coupling unit 36 feeds a balanced modulator 41 with radio frequency inputs to the two amplifiers 42, 43 in parallel. The side band modulating frequency is introduced into the anode circuits of amplifiers 42 and 43 by means of a high power modulating transformer 44. The output from the balanced modulator is obtained from the tuned transformer coupling 45, and consists of a double side band of frequencies as will be well understood.

In the case of the aerial system of Figure 2 the output from 45 is fed directly to the aerial 5 via a transmission line 46.

In the case of the aerial system of Figure 4 the output from 45 is fed through a switch or commutator represented by block 47 which excites the aerials 10, 11 alternately in dot-dash rhythm via transmission lines 48, 49. The item 47 may be an arrangement as described for example in the aforementioned Patent Nos. 2,444,081 and 2,413,018.

Whilst one form of modulator has been described, it will be understood that the type chosen will, in general, be the most convenient and uncritical to operate. In general, the operation of the system will not be much affected by small variations from the ideal wherein the sidebands contain a small percentage of unwanted carrier and the unmodulated carrier a small percentage of unwanted side bands.

As hereinbefore stated the carrier frequency may be amplitude modulated or frequency or phase modulated in accordance with a signal wave, by any well known means, for example at the stage 37 and this fact is indicated in Figure 9 by the block 50 associated with the grid of valve 37.

The receiver on the mobile aircraft using the approach path beacon may be any known type of frequency or phase modulation receiver comprising an amplitude limiter followed by a frequency or phase discriminator. The limiter stage ensures that constant amplitude of the received frequency is applied to the discriminator which gives in its output a series of dot or dash signals when the receiver is in the vicinity of the course and a continuous signal when the receiver is on the course. Thus any known type of indicator used on the conjugate dot dash type of blind approach path system may be employed in the systems according to the present invention.

It should be observed that there are some embodiments of this invention in which the frequency or phase modulation of varying depth produced in space is accompanied by so much spurious frequency modulation distortion and amplitude modulation and are consequently much inferior to the preferred embodiments hereinbefore described.

In one such embodiment two phase or frequency modulated waves are radiated from substantially the same centre with 180° phase difference in carrier but with side-bands in-phase, the amplitude of one wave being always appreciably less than that of the other (equality results in pure amplitude modulation being radiated).

The radiation patterns may then be different and effect a phase or frequency modulation which varies from point to point in space provided the excursions of the transmitted waves are not great and the excursion of the resultant wave may be greater than the excursions of the transmitted waves, its magnitude depending upon the ratio of the amplitudes of the transmitted radiations at the receiver location.

The preferred embodiments hereinbefore described which have a relatively small modulation index, i. e. the ratio of the variation of radio frequency away from the mean frequency to modulating frequency for the phase modulation defining the course possess the following advantages.

(*a*) The carrier frequency and transmitter modulating frequency can be the same for all beacons, in fact they can be synchronised if necessary.

(*b*) All carriers are continuously modulated, the beacons being always in use, and from considerations of interference between stations provides two further advantages.

(*c*) Cross-talk between the stations is readily overcome by 6 db difference in signal level.

(*d*) Beat note interference (which usually entails a modulation index of 2:1 for good interference suppression) is not present as in the case of synchronised carrier and modulation side bands; the relative phases with the transmission of adjoining beacons will be constant and the beat frequency will be zero.

Thus it will be seen that with a speech band of 400 to 2,500 cycles/sec. modulating the carrier and a side band course definition frequency of 10,000 cycles/sec. or more and with separation of the speech band and course defining frequency band by filtering, a 6 db level difference can give no interference to the course defining frequency band, and mutual interference between course defining frequencies and speech on the carrier will be filtered out.

Although the use of 30° excursion for speech superimposed on the carrier wave used for path definition ensures that a large carrier wave is always present for producing the phase or frequency modulation in space and thereby give maximum signal/noise ratio and thus ensures that the course definition is always available, large modulation indices for speech say up to 120° phase excursion will give an average course defining signal which will have an efficiency of at least one third the efficiency when low excursion is used, and is quite suitable in practice.

There is a further factor that reduces interference of aircraft beacons at landing speeds of 2 to 3 miles per minute, viz. the phase of the interference is reversed at a relatively high speed due to the difference of the distances from two interfering stations changing rapidly in half wavelength steps. Thereby the relatively slow dot dash course variations average out on the meter when the plane is following the course line.

In the case in which frequency multiplication is employed in the receiver to increase the phase and frequency modulation excursion the ideal method to avoid cross-modulation (due to frequency multiplier non-linearity) of mixed frequency or phase modulated signals is to frequency change and then amplify the signal to a high signal level, and then use an amplitude limiter followed by a frequency multiplier having a multiplying factor of four or higher plus some amplification if necessary before applying the output to a second amplitude limiter.

This method will give a modulation index of 2:1 compared to that of one half (1:2) while still using 30° maximum phase excursion for course definition and for speech and thereby reducing interference by speech channels of adjacent stations at the expense of a slight complication of the receiver.

What is claimed is:

1. A radio navigational system for defining a path or course by two overlapping radiation diagrams commutated to produce complementary signals on either side of the course respectively, comprising a first source for providing energy at side band frequency of an amplitude modulated carrier wave, a second source providing energy having an unmodulated carrier frequency wave, an antenna system including a conducting plate, antenna means located above said plate, and antenna means below said plate, means for coupling said sources respectively to different of said antenna means, and means for commutating at least one of said sources with respect to said antenna system, whereby the resulting patterns are oscillated about a desired course line in complementary signal fashion.

2. A radio navigational system according to claim 1 comprising above said plate a central antenna excited by one of said energy providing means, and two auxiliary antennae arranged one on either side said central antenna and adapted to operate alternately as deflectors or as director and reflector, and below said plate an antenna excited by the other of said energy providing means.

3. A radio navigational system according to claim 1 comprising above said plate two linear antennae arranged to be excited alternately from one of said energy providing means, and below said plate a linear antenna arranged to be excited with the other of said energies.

4. A radio glide path system for aircraft for defining the path by two overlapping distribution patterns in a vertical plane, comprising a first source for providing energy at side band frequency of an amplitude modulated carrier wave, a second source providing energy having an unmodulated carrier frequency wave, first antenna means excited by said first source having two antennae off-set on opposite sides of the vertical plane containing the glide path, being alternately excited, and a second antenna means located behind, as regards a landing aircraft, said first antenna means, and means for commutating at least one of said sources with respect to said antenna system, whereby the resulting patterns are oscillated about a desired course line in complementary signal fashion.

5. A radio glide path system according to claim 4 wherein the first antenna means comprises a horizontal dipole with or without a reflector mounted at a height of 4 to 6 wavelengths at the operating frequency, above the ground, and said other antenna means is much more highly directive in the vertical plane than said first antenna means and is mounted close to the ground.

6. A radio glide path system as claimed in claim 5 wherein said more highly directive antenna means comprises a dipole with parabolic reflector.

7. A radio glide path system according to claim 4 wherein said second antenna means comprises a dipole and parabolic reflector.

8. A radio navigational system for defining a path or course by two overlapping radiation diagrams commutated to produce complementary signals on either side of the course respectively, comprising a first source for providing energy at side band frequency of an amplitude modulated carrier wave, a second source providing energy having an unmodulated carrier frequency wave, an antenna system comprising two antenna means, each comprising two antennae and a reflector, one of said antennae being located at the focal point of said reflector and excited with one of said energies and the other antenna at a point of focus and excited by the other of said energies, said two antenna means being excited alternately, whereby both the unmodulated carrier wave energy and side-band energy are oscillated about the desired path.

9. A radio navigational system for defining a path or course by two overlapping radiation diagrams commutated to produce complementary signals on either side of the course respectively, comprising a first source for providing energy at side band frequency of an amplitude modulated carrier wave, a second source providing energy having an unmodulated carrier frequency wave, an antenna system comprising two conducting plates at right angles and above one of said plates two interlaced antenna arrays excited alternately by one of said energy providing means, and below said conducting plate an array of antennae excited by the other of said energy providing means, said other conducting plate functioning as a reflecting surface to all the antenna arrays.

ERIC OSBORNE WILLOUGHBY.

REFERENCES CITED

The following references are of record in the file of this patent:

UNITED STATES PATENTS

| Number | Name | Date |
|---|---|---|
| 1,922,677 | Grey et al. | Aug. 15, 1933 |
| 1,933,248 | Evans | Oct. 31, 1933 |
| 2,095,083 | Renatus | Oct. 5, 1937 |
| 2,279,031 | Cockerell et al. | Apr. 7, 1942 |
| 2,343,196 | Luck | Feb. 29, 1944 |
| 2,367,372 | Purington | Jan. 16, 1945 |

FOREIGN PATENTS

| Number | Country | Date |
|---|---|---|
| 114,495 | Australia | Jan. 15, 1942 |